INVENTORS
Richard Henry Evans
Roy Bagley

Jan. 14, 1964
R. H. EVANS ETAL
3,117,558
INTEGRAL TUBE AND WALL PANELS
Filed Aug. 31, 1959
11 Sheets-Sheet 2
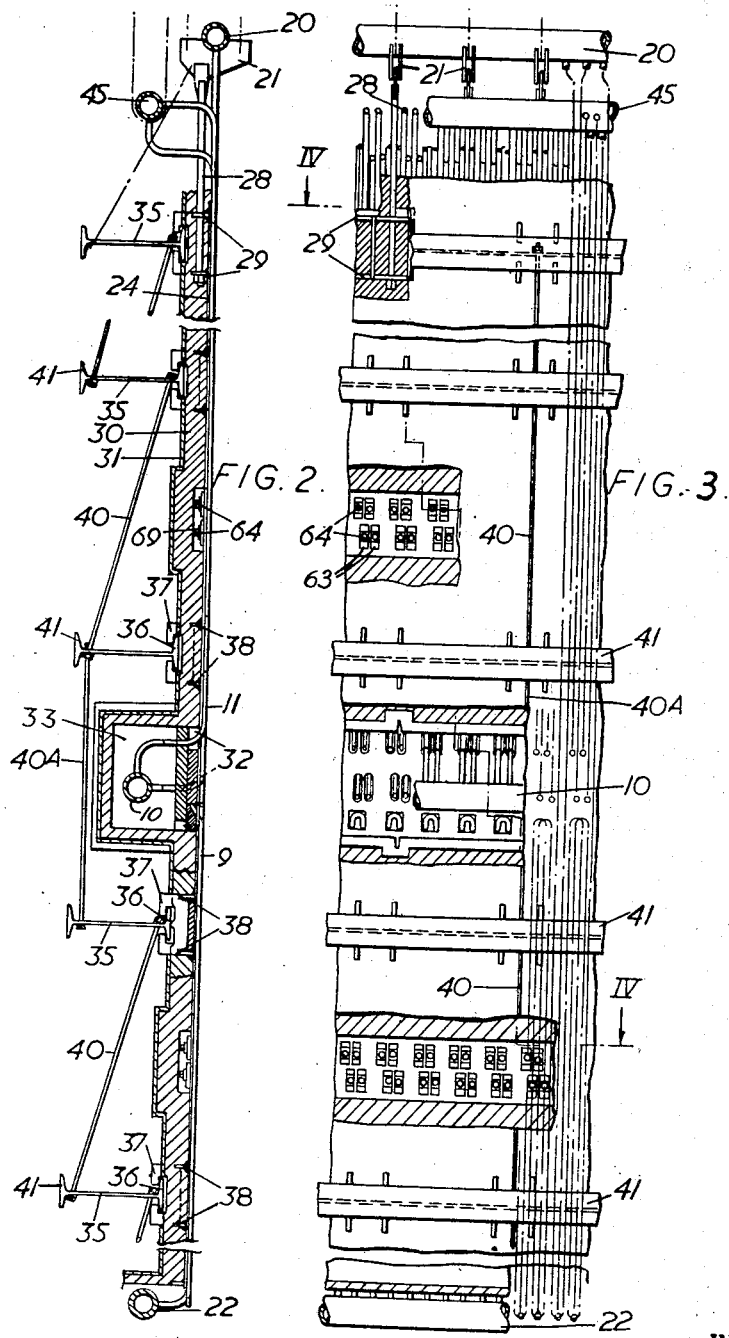
INVENTORS
Richard Henry Evans
Roy Bagley
BY
ATTORNEY INVENTORS
Richard Henry Evans
Roy Bagley
BY
ATTORNEY

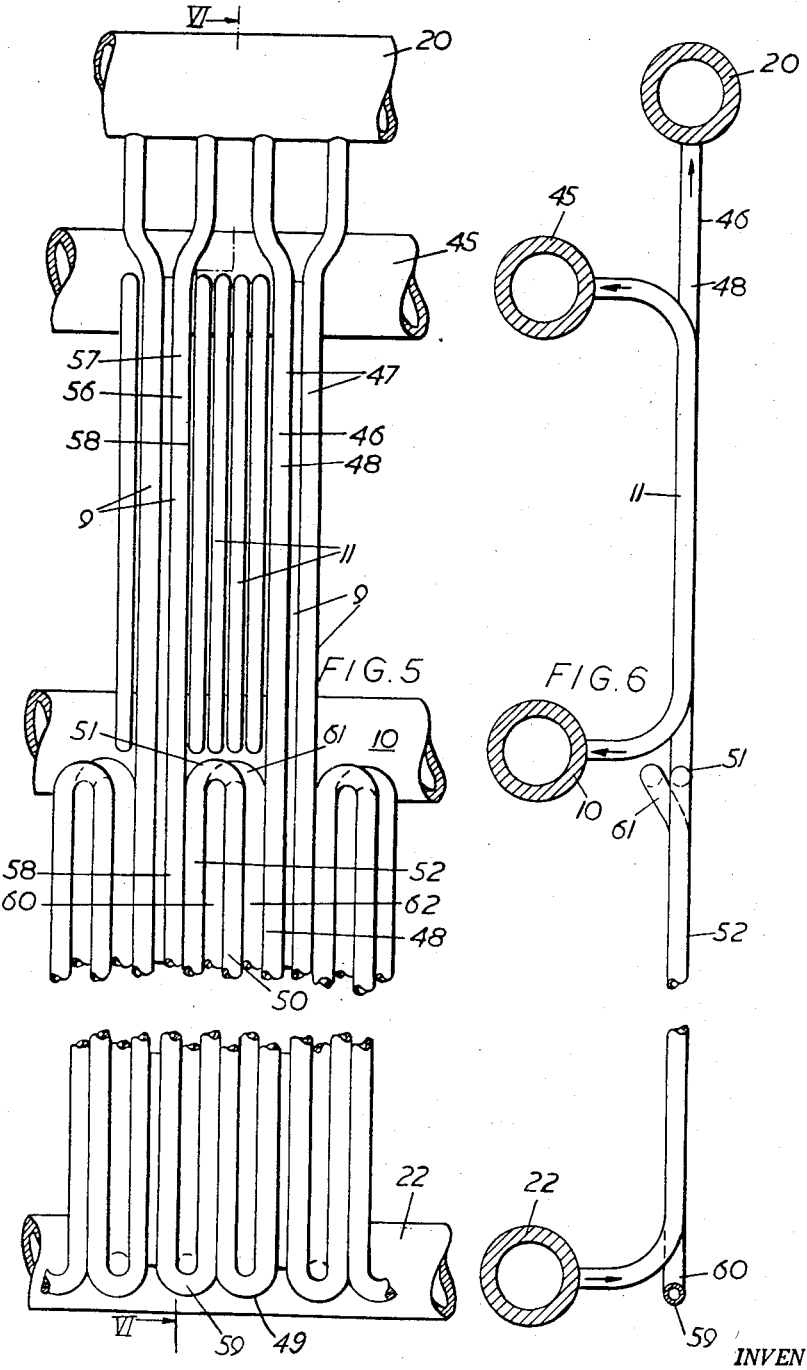

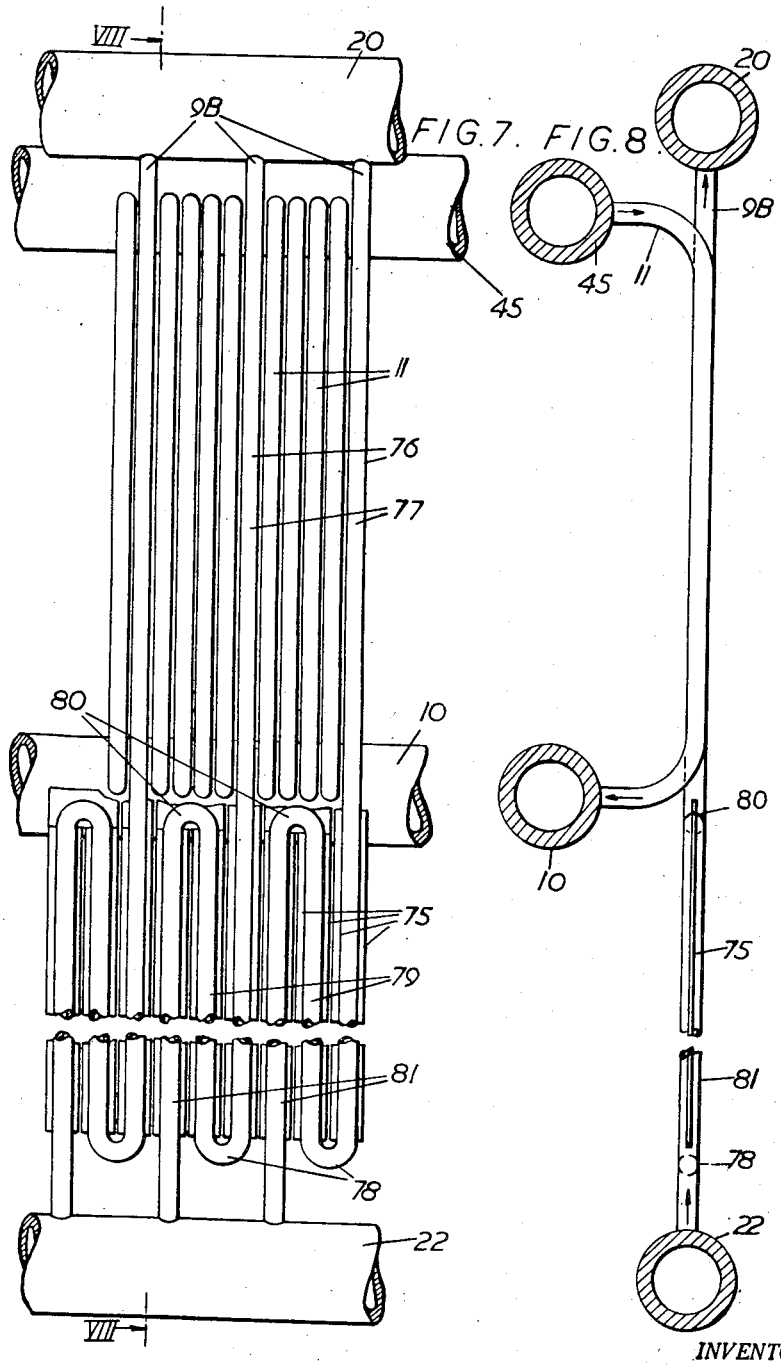

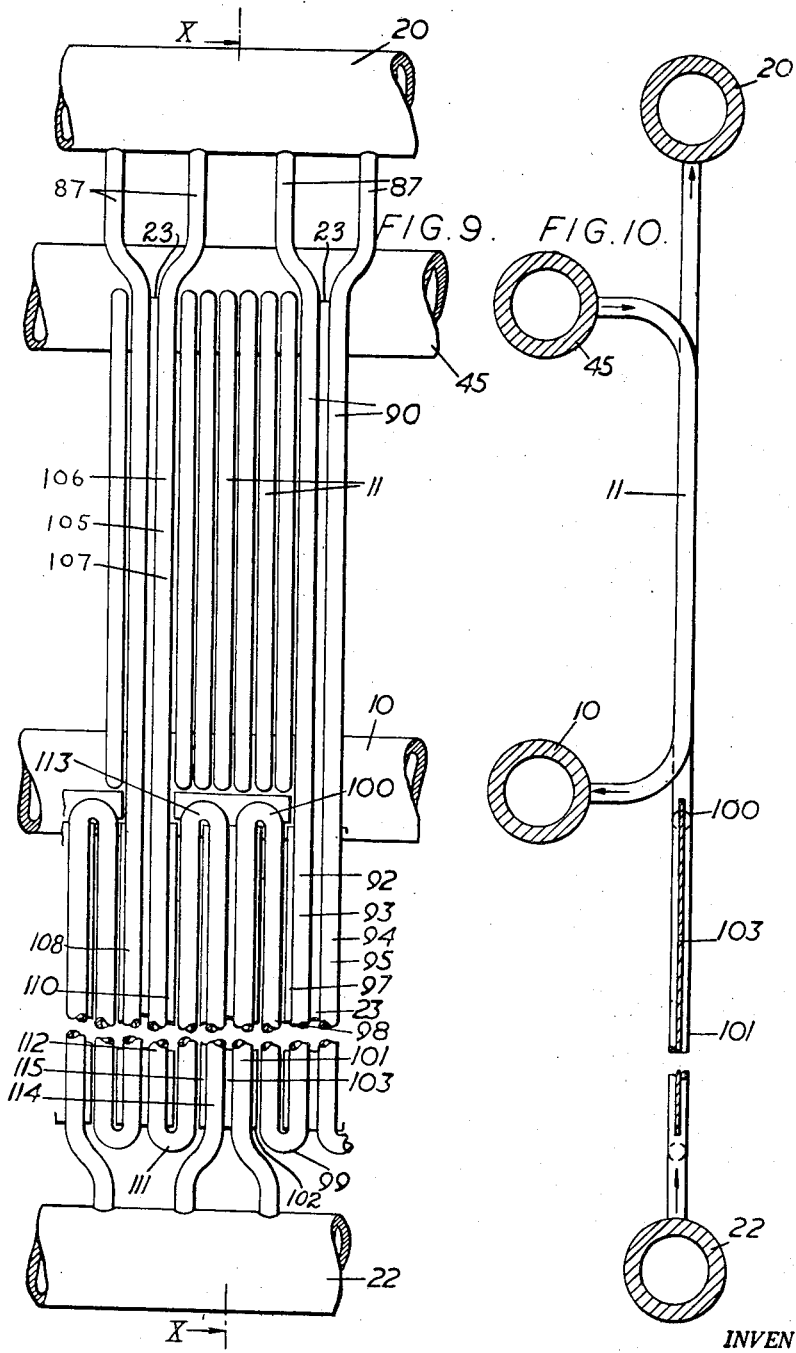

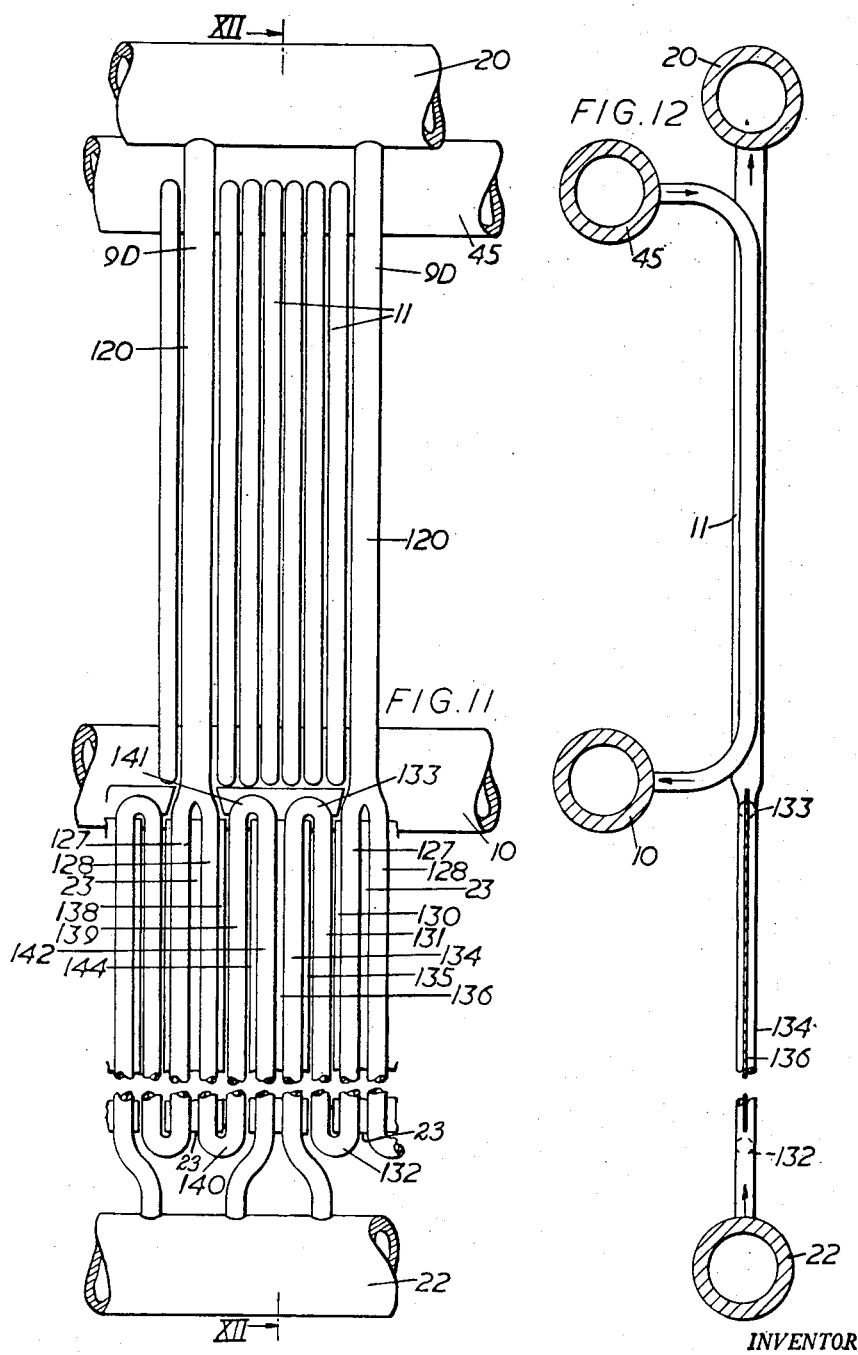

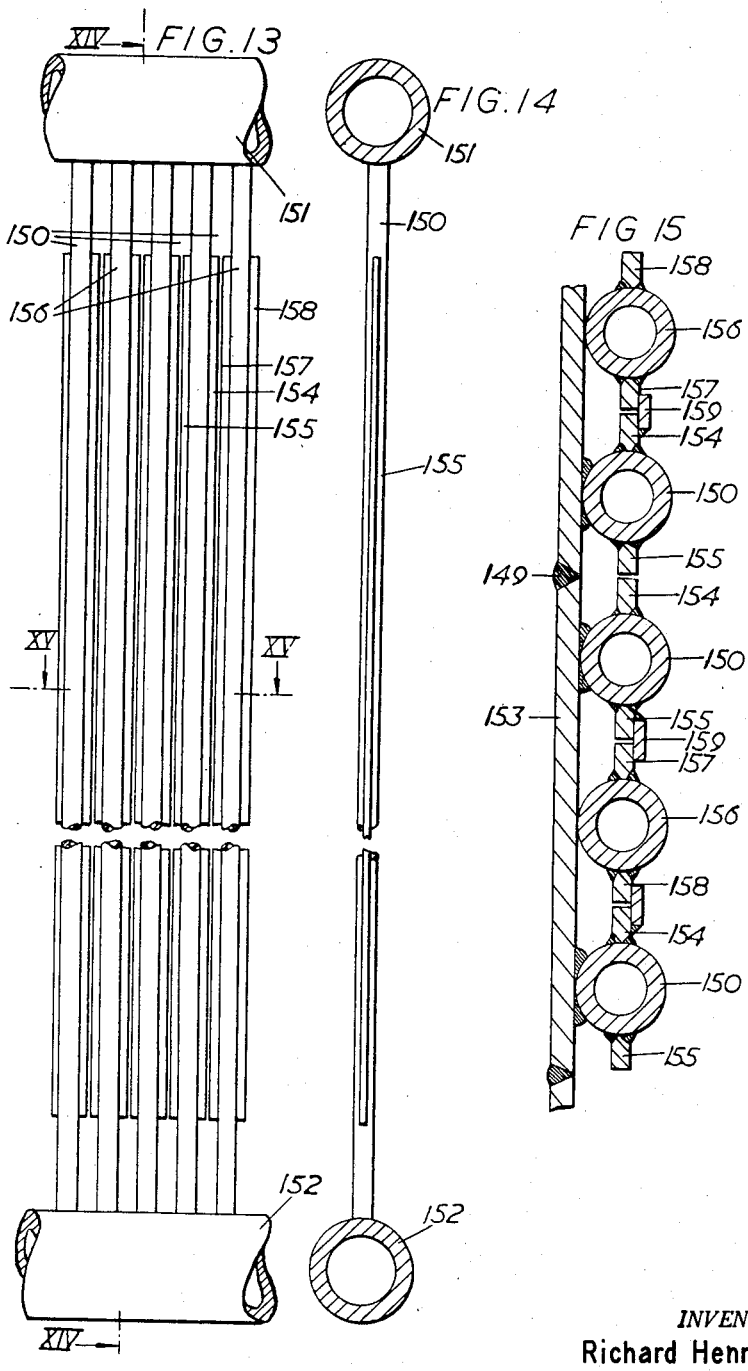

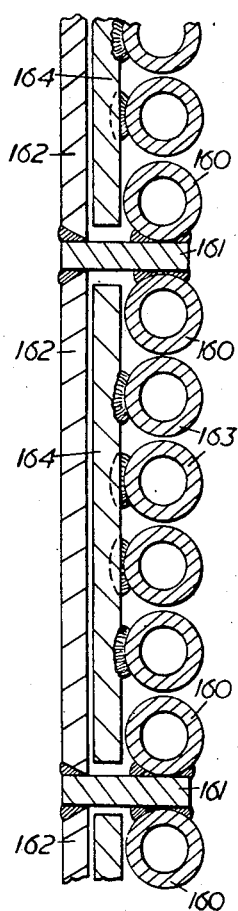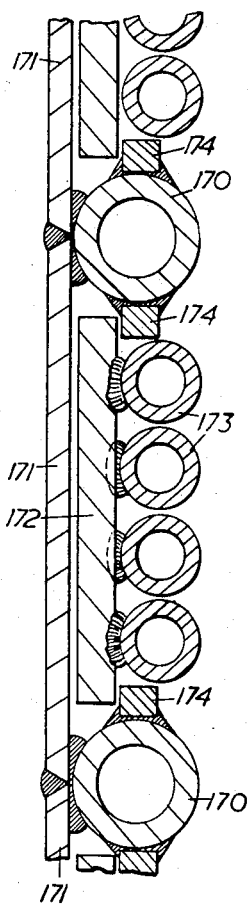

Jan. 14, 1964 R. H. EVANS ETAL 3,117,558
INTEGRAL TUBE AND WALL PANELS
Filed Aug. 31, 1959 11 Sheets-Sheet 10
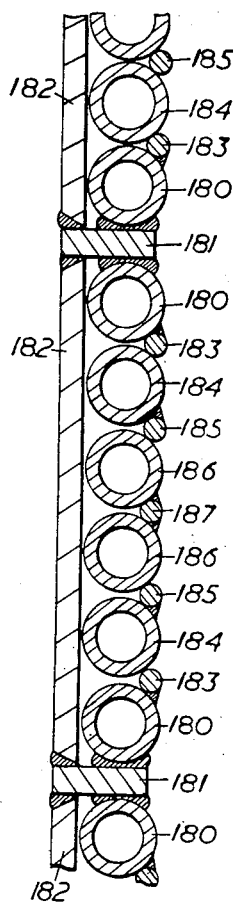
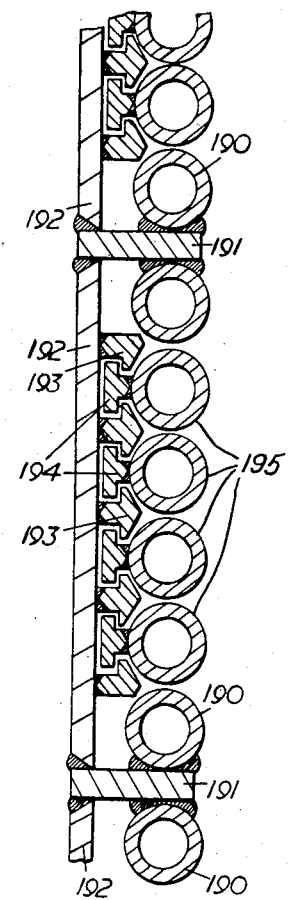
INVENTORS
Richard Henry Evans
Roy Bagley
BY
ATTORNEY Jan. 14, 1964  R. H. EVANS ETAL  3,117,558
INTEGRAL TUBE AND WALL PANELS
Filed Aug. 31, 1959  11 Sheets-Sheet 11

INVENTORS
Richard Henry Evans
BY Roy Bagley
ATTORNEY

United States Patent Office 3,117,558
Patented Jan. 14, 1964

1

3,117,558
INTEGRAL TUBE AND WALL PANELS
Richard Henry Evans, Surrey, and Roy Bagley, London,
England, assignors to Babcock & Wilcox, Limited, London, England, a corporation of Great Britain
Filed Aug. 31, 1959, Ser. No. 837,229
9 Claims. (Cl. 122—6)

This invention relates to tubulous vapor generating units and to an improved method of forming a tube wall and particularly to tubulous vapor generating units of the kind including a furnace or radiation chamber having a wall or wall section with wall tubes adapted to operate with forced flow of fluid therethrough. The forced flow may, for example, be induced by a feed pump or it may result from the application to the tubes at their inlet ends of vapor generated by a natural circulation boiler.

In a known form of high capacity vapor generator, vapor generation is effected at high pressure, at least largely in a radiant section involving a large furnace chamber which may be followed by a radiation chamber. The chambers or chamber may be of height so that the wall surface of the chamber or chambers is large and the cost of a vapor generating unit is greatly affected by the form of wall construction and the mode of erection. The efficiency of the unit is also influenced since air and gas tightness of the walls is of importance.

In order to achieve leak proof walls metal casings have been adopted, but the use of such casings has involved complicated provisions for accommodation of differential expansions and contractions. Moreover, penetration of furnace gases to the inner surface of a cool casing is liable to result in severe casing damage due to acid attack following condensation.

In a high pressure vapor generating unit operating with forced flow and utilizing small diameter wall tubes of great lengths, the formation in an economical manner of chamber walls of adequate rigidity and the maintenance of the wall tubes in their proper relative positions by simple but effective means are problems of importance.

A large part of the cost of and time occupied in the manufacture of a large modern central station vapor generator is due to site erection and any steps enabling reduction of work on site would be of great practical value. This is particularly true of welding which may usually be accomplished more economically and effectively under shop conditions.

In a tubulous vapor generating unit including a furnace or radiation chamber having a wall or wall section with wall tubes adapted to operate with forced flow of fluid therethrough according to the present invention, a metal casing is disposed outwardly of and close to or in contiguous relationship with parallel casing-united wall tube lengths at least some of which are spaced apart by short distances sufficient to accommodate an intermediate tube length or intermediate tube lengths, which extend between or substantially between opposite limits of the wall or wall section, which are adapted to operate in parallel flow paths with the same direction of flow through the tube lengths and with equal or approximately equal inlet temperatures of the fluid flowing through the tube lengths, and each of which is rigidily and continuously or substantially continuously united with the casing by jointing means extending from end to end or substantially from end to end of the tube length and affording a path of good thermal conductivity between the tube length and the casing, and with at least one intermediate tube length being accommodated in each of the said short distances between casing united tube lengths.

In the operation of the vapor generator, since the casing-united tube lengths are spaced apart only by short

2 distances, and since the tube lengths are united with the casing by jointing means affording paths of good thermal conductivity between the tube lengths and the casing and since the temperature gradients along the lengths of the said tubes are similar, the casing as a whole assumes transversely of the tube lengths approximately uniform temperatures and in the direction of the tube lengths a temperature gradient similar to that of the tubes. As a result, difficulties arising from differential thermal expansion between the casing and the casing-united tube lengths are largely or wholly avoided. At the same time, since only some of the tubes are rigidly united with the casing, the work of uniting the said tubes and the casing is minimized. The union between the tubes and the casing affords relatively great rigidity in the direction of the lengths of the tubes.

The invention will now be described, with reference to the accompanying, partly diagrammatic drawings, in which:

FIGURE 2 is a sectional side elevation of upper, lower and intermediate portions of the front wall of the unit;

FIGURE 3 is a partly sectional front elevation of a portion of the front wall shown in FIGURE 2;

FIGURE 5 shows a part of the wall tube arrangement of FIGURE 3;

FIGURE 6 is a sectional side elevation on the line VI—VI of FIGURE 5;

FIGURE 7 shows a part of an alternative wall tube arrangement;

FIGURE 8 is a sectional side elevation on the line VIII—VIII of FIGURE 7;

FIGURE 9 shows a part of a further alternative wall tube arrangement;

FIGURE 10 is sectional side elevation on the line X—X of FIGURE 9;

FIGURE 11 shows a part of a further alternative wall tube arrangement;

FIGURE 12 is a sectional side elevation on the line XII—XII of FIGURE 11;

FIGURE 13 shows a part of a further alternative wall tube arrangement;

FIGURE 14 is a sectional side elevation on the line XIV—XIV of FIGURE 13;

FIGURE 15 is a sectional plan view on the line XV—XV of FIGURE 13;

FIGURES 16–18 show alternative constructions adapted to position tubes adjacent the casing FIGURES 19–25 show alternative constructions adapted to position tubes with respect to the wall.

Figure 1:
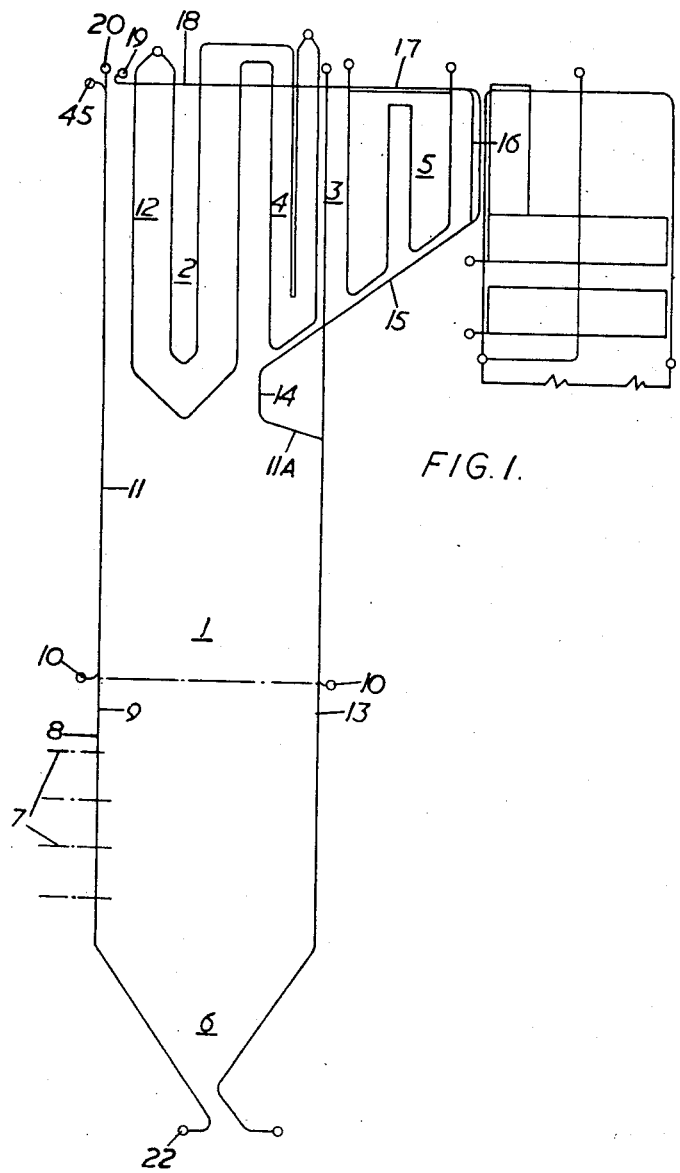
FIGURE 1 is an outline drawing of a side elevation of a tubulous forced flow once-through vapor generating unit showing the general tube arrangement.

Referring to FIGURE 1 of the drawings, a once-through forced flow vapor generating and superheating unit comprises a vertically elongated furnace chamber 1 defined by fluid cooled walls, including a front wall 8 and a rear wall 13, and having an upper region 2 opening to a laterally extending gas pass 3 containing convection superheating and reheating surfaces 4 and 5, respectively. The vapor generator is top-supported by means of suitable structural steel work (not shown). The furnace chamber 1 is provided with a hopper bottom 6 and is fired by burners, the centerlines 7 of which are indicated, situated in the front wall 8. The front wall of the furnace chamber 1 is lined with vapor generating tubes 9 together with, above the level of a superheater outlet header 10, vapor superheating tubes 11. Further superheating surfaces 12 are provided in the upper region 2 of the furnace chamber 1. Vapor superheating tubes 11A included in the rear wall 13 have their upper and lower ends connected to inlet header 10' and outlet header 19, respectively, and are bent inwardly and upwardly to form an arch 14 at the upper region 2 of the furnace chamber 1. The superheating tubes 11A are further bent to form a floor 15, an outlet screen 16 and roof 17 of the lateral gas pass 3 and a roof 18 of the furnace chamber 1.

Figure 4:
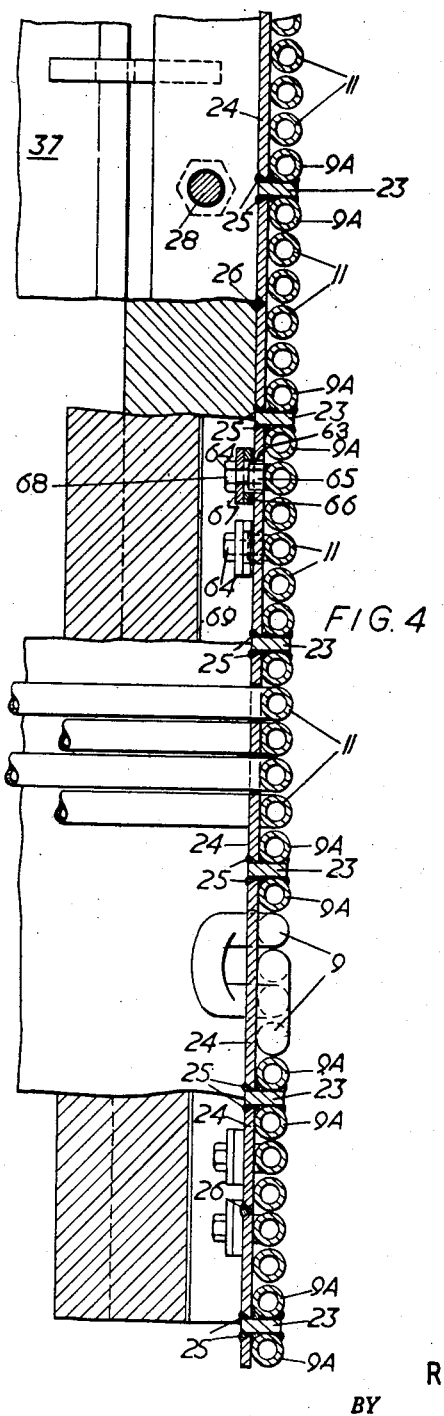
FIGURE 4 is a sectional plan view taken on the line IV—IV of FIGURE 3 to an enlarged scale.

Referring to FIGURES 2, 3 and 4 of the drawings, the tubes 9 of the front wall 8 have their outlet ends connected to an outlet header 20 suspended by suitable means, including header brackets 21, from the steel work of the unit so that the tubes expand downwardly from the header 20. The inlet ends of the tubes 9 are connected to an inlet header 22 arranged to be supplied by a forced flow pump (not shown).

As described below, the vapor generating tubes 9 are arranged in pairs having adjacent limbs extending downwardly from the header 20 over the height of the furnace chamber and the limbs 9A of each pair are disposed at opposite sides of and are welded to a bar-like member 23. The laterally spaced members 23 are united by welds 25 to casing plates 24 so that the tube lengths or limbs 9A are casing united.

Advantageously groups of casing plates and casing united tube lengths are shop-assembled, the groups being connected together on site by welds such as those indicated by the number 26.

The casing is in part supported from the header 20 by the tube limbs 9A, but additional supporting means in the form of sling rods 28 are provided between brackets 29 on uppermost casing plates 24 and header brackets 21.

In operation, the bar-like members 23 serve as heat conducting paths helping to maintain the casing adequately heated. They also help to rigidify the casing.

At the outer side of the casing plates 24 is provided suitable insulation 30 mechanically protected by a light outer metal skin 31.

The casing plates 24 and the insulating material 30 are provided with vertically-elongated apertures 32 for the penetration of the top-supported superheating tubes 11 to connect with the superheater outlet header 10 located adjacent to but outside the casing plates 24, the header 10 being enclosed in a suitable gas-tight chamber 33 associated with the wall 8.

From level to level in its height the wall 8 is laterally supported by buckstays each of which is in the form of an I-beam 35 an inner flange 36 which is engaged by U-shaped members 37 each spaced from but connected with the casing plates 24 by metal plates 38 welded to the U-shaped member 37 and to the casing plates 24. In general each buckstay 35 is supported adjacent its outer edge by tie rods 40 extending from the buckstay adjacent its outer flange 41 to a superjacent buckstay adjacent the inner flange 36 thereof. At the level of the gas-tight chambers 33, however, the subjacent buckstay is supported by tie-rods 40A extending between the buckstays adjacent the outer flange 41 thereof.

Each buckstay is connected, at its ends, by links (not shown) and brackets secured to the casing at the adjacent corners of the furnace chamber 1. It will be appreciated therefore that the casing plates 24 and the barlike members 23 of the side walls running between opposite buckstays of a set secure and tie together those buckstays.

As indicated in FIGURES 5 and 6, the vapor generating tubes 9 extend downwardly from the header 20 as pairs, with the radiant superheating tubes 11 positioned between the pairs and extending between an upper superheater inlet header 45 and the lower superheater outlet header 10. The header 45 is top-supported by suitable means so that the tubes 11 expand downwardly from the header 45. Below the level of the superheater outlet header 10 the vapor generating tubes 9 are arranged in a sinuous manner. Thus a tube 46 of a tube pair 47 includes a first limb 48 extending downwardly from the outlet header 20 and connected by a return bend 49 at the level of the inlet header 22 to a second tube limb 50 disposed to the left of the first limb 48, as seen in FIGURE 5; a third limb 52 disposed to the left of the second limb 50 and connected at its outlet end to the inlet end of the limb 50 by a return bend tube portion 51 disposed at the level of the header 10; and is finally bent outwardly at the level of the inlet header 22 to connect into that header. The first limb 48 is united along its length to a member 23 and thus to casing plates in the manner hereinafter described in connection with FIGURE 4. A tube 56 of an adjacent tube pair 57 includes a first limb 58 extending downwardly from the header 20 and connected by a return bend tube portion 59 at the level of the lower inlet header 22 to a second limb 60 disposed to the right of the first limb 58, as seen in FIGURE 5, and interjacent the second limb 50 and third limb 52 of the tube 46; a third limb 62 connected at its outlet end to the inlet end of the limb 60 by a return bend tube portion 61 disposed at the level of the superheater outlet header 10 and angled outwardly to permit accommodation of the limb 62 between the first limb 48 and the second limb 50 of the tube 46; and is finally bent outwardly at the level of the lower inlet header 22 to connect into that header.

It will be understood that different pairs of tubes are similarly arranged.

The vapor superheating tubes 11 are positioned relative to the casing plates 24, as is shown in FIGURES 2–4, by bolts 64 extending through vertically elongated slots 63 in the casing plates 24 and co-acting with internally threaded collars 65 welded to the superheating tubes 11. Spacing members 66 formed with vertically elongated slots and having washers 67 welded thereto are provided intermediate the heads 68 of the bolts 64 and the casing plates 24. The collars 65 are of square cross-section and of dimensions to engage the sides of the slots in the casing plates 24 and spacing members 66, thereby preventing rotation of the tubes 11 and spacing members 66 relative to the casing plates 24. On assembly, the bolts 64 are tightened within the collars 65 to a degree permitting vertical movement of the bolts 64 within the slots 63 and the slots of the spacing members 66 while restraining lateral movement between the superheating tubes 11 and the casing plates 24. The head 68 of the bolt is tack-welded to the washer 67 to prevent rotation thereof.

Box-like members 69 are welded to the casing plates 24 around the bolts 64 and serve to prevent leakage of furnace gases through the vertically elongated slots in the casing plates 24.

A connection arrangement similar to the one described for the tubes 11 may be utilized to position the second and third tube limbs of the steam generating tubes 9 relative to the casing plates 24.

Other arrangements of the wall tubes and/or their attachment to casing plates, such as those described below, may be utilized.

Referring to the alternative arrangement shown in FIGURES 7 and 8 of the drawings, vapor generating tubes 9B extend singly from the upper outlet header 20, radiant superheating tubes 11 being positioned between the tubes 9B and extending between the upper inlet header 45 and the lower outlet header 10. Below the level of the superheater outlet header 10 the vapor generating tubes 9B are arranged in a sinuous manner with their limbs at spaced intervals, the spaces being substantially closed by longitudinal fins 75 provided on the tube lengths at diametrically opposite locations. Thus each of a number of vapor generating tubes 76 includes a first limb 77 welded along the length thereof to casing plates in a manner described herebelow in connection with FIGURE 15 and provided, below the level of the superheater outlet header 10, with longitudinally extending fins 75; a return bend 78 connecting the limb 77 to a second limb 79 provided with longitudinally extending fins 75 and disposed to the left of the first limb 77; a return bend 80 disposed at the level of the superheater outlet header 10 and connecting the limb 79 to a third limb 81 provided with longitudinally extending fins 75 and disposed to the left of the second limb 79. The limb 81 has its inlet end connected into the lower inlet header 22.

In the alternative arrangement shown in FIGURES 9 and 10 of the drawings, vapor generating tubes 9C extend downwardly from an upper outlet header 20 as spaced tubes pairs 87, radiant superheating tubes 11 being positioned between the tube pairs 87 and extending between an upper inlet header 45 and a lower outlet header 10. Below the level of the superheater outlet header 10 the steam generating tubes 9C are arranged in a sinuous manner. Thus a vapor generating tube 92 includes a first limb 93 welded along the length thereof to a bar-like member 23 which in turn is welded to casing plates 24 in a manner similar to that described in connection with FIGURE 4, a first limb 94 of the adjacent tube 95 of the pair also being welded along the length thereof to the bar-like member 23. The first limb 93 of the tube 92 is provided, below the level of the superheater outlet header 10, with a longitudinally extending fin 97 disposed at the diametrically opposite side of the limb to the bar-like member 23. The tube limb 93 is connected to a second tube limb 98 by a return bend 99, a further return bend 100 connecting the second tube limb 98 to a third tube limb 101 provided with diametrically opposed, longitudinally extending fins 102, 103. A tube 105 of another pair of vapor generating tubes 87 includes a first limb 107 extending downwardly from the outlet header 20 and connected to casing plates and to the other tube 108 of the pair 106 by means of a bar-like member 23 in a manner similar to that described in connection with FIGURE 4. The limb 107 is further provided, below the level of the superheater outlet header 10, with a longitudinally extending fin 110 positioned diametrically opposite the bar-like member 23. A return bend 111 connects the limb 107 to a second limb 112, another return bend 113 connecting the second limb 112 to a third limb 114 provided with a longitudinally extending fin 115 and welded to the longitudinally extending fin 103 of the tube limb 101, the vapor flows within the limbs 101 and 114 being in the same direction and at substantially the same temperatures.

If it is so desired, the tube-limbs 101, 114 may be connected to each other and to casing plates along the lengths thereof by a suitable bar-like member, similar to the member 23.

In the alternative arrangement shown in FIGURES 11 and 12 of the drawings, spaced vapor generating tubes 9D include tube lengths 120 of relatively large diameter extending singly from the upper outlet header 20, radiant superheating tubes 11 being positioned between the vapor generating tube lengths 120 and extending between an upper inlet header 45 and a lower outlet header 10. At the level of the superheater outlet header 10 the vapor generating tubes 9D bifurcate into tube lengths 127 and 128. Above the level of the superheater outlet header 10 the tube length 120 is welded to casing plates in a manner similar to that described below in connection with FIGURE 15. A bar-like member 23 positioned between the tube limbs 127, 128 is welded to each of the limbs 127, 128 and to the casing plates in a manner similar to that described in connection with FIGURE 4. The tube limb 127 is further provided with a longitudinally extending fin 130 positioned diametrically opposite the bar-like member 23 and is connected to a second limb 131 by a return bend 132. A further return bend 133 connects the second tube limb 131 to a third tube limb 134 provided with diametrically opposed longitudinally extending fins 135, 136 and connected into the lower inlet header 22. The tube limb 128 of another of the tubes 9D is provided with longitudinally extending fin 138 positioned diametrically opposite to the bar-like member 23 and is connected to a second tube limb 139 by a return bend 140. A further return bend 141 connects the second tube limb 139 to a third tube limb 142 provided with a longitudinally extending fin 144 and connected to the longitudinally extending fin 136 of the tube limb 134. The tube limb 142 has its inlet end connected to the header 22. It will be understood that, if it is so desired, the tube 120 of relatively large diameter may extend downwardly to the region of the lower inlet header 22 and be provided with bifurcations connecting with upwardly extending tubes at the level of the header 22. Also, if it is so desired, the tube limbs 134, 142 may be connected to each other and a casing plates along the lengths thereof, by a suitable bar-like member similar to the member 23.

In the arrangement shown in FIGURES 13–15 a wall lined solely with vapor generating tubes is indicated, the vapor generating tubes being arranged in single runs and alternate tubes being welded along the lengths thereof in groups to casing plates. Thus vapor generating tubes 150 extend between an upper outlet header 151 and a lower inlet header 152 and are welded along the lengths thereof to casing plates 153 at both sides of a line of contiguity between the tubes 150 and the casing plates 153 which are then united by butt welds 149 located between adjacent tubes 150. With such construction the weld deposits at the sides of the tubes 150 adjacent the edges of the respective casing plates 153 may readily be made before the plates are assembled and welded together and while the grooves between the tubes 150 and the inner faces of the plates 153 adjacent the edges thereof are accessible. The tubes 150 are provided with diametrically opposed, longitudinally extending fins 154, 155. Intermediate the tubes 150 connected to each casing plate are positioned intermediate tubes 156 provided with longitudinally extending fins 157, 158. The tubes 156 are held in position adjacent the casing plates 153 by means of spaced locating fingers 159 welded to the adjacent longitudinally extending fins 154, 155 of the tubes 157 and overlapping the respective longitudinally extending fins 157, 158 of the tubes 156. It will be understood that, by utilizing suitable positioning means described hereinbelow in connection with FIGURE 18, the tubes extending between the lower inlet header 152 and the upper outlet header 151 instead of being provided with fins may be arranged contiguously.

Tubes intermediate the tubes secured to the casing plates along the lengths thereof may be positioned adjacent the casing plates by positioning means other than the means described in connection with FIGURE 4.

Thus as shown in FIGURE 16 of the drawings, casing-united tube lengths 160 are welded to bar-like members 161 which, in turn, are welded to casing plates 162. Intermediate tubes 163 are welded to longitudinally spaced transverse bars 164, the bars being free to move vertically but restrained from moving horizontally into the furnace chamber, the ends of the bars 164 overlapping the tubes 160 and being located between the outer sides of the casing-united tube lengths 160 and the casing plates 162.

In the alternative arrangement shown in FIGURE 17 of the drawings, casing-united tube lengths 170 of relatively large external diameter similar to the tube lengths 120 shown in FIGURE 11 are welded directly to casing plates 171. The ends of longitudinally spaced transverse bars 172, to which intermediate tubes 173 are welded, extend behind and in overlapping relation with longitudinally extending fins 174 provided on the casing-united tube lengths 170, the arrangement being such that a single plane is tangent to all the tube lengths 170, 173 at the inner sides thereof.

In the alternative arrangement shown in FIGURE 18 of the drawings, casing-united tube lengths 180 are welded to bar-like members 181, which, in turn, are welded to casing plates 182. Short rods 183 welded to the casing-united tube lengths at spaced intervals along the lengths thereof overlap adjacent intermediate tube lengths 184. Each intermediate tube length 184 is similarly provided with short rods 185 welded to the intermediate tube at spaced intervals along the lengths thereof and overlapping an adjacent intermediate tube length 186, the tube length 186 being one of a middle pair of intermediate tube lengths which at spaced intervals along the lengths thereof are united by short rods 187 welded to each of the intermediate tubes of the pair.

Alternatively the tubes intermediate the tube lengths united to the casing plates may be positioned with respect to the casing plates. Thus in the arrangement shown in FIGURE 19 of the drawings, casing-united tube lengths 190 are welded to bar-like members 191 which, in turn are welded to casing plates 192. Interengaging hook-like members 193, 194 respectively welded to the casing plates 192 at the interior thereof and to intermediate tube lengths 195 at the outer sides thereof are adapted to restrain movement of the intermediate tube lengths away from the casing plates 192 while permitting relative longitudinal movements between the intermediate tube lengths 195 and the casing plates 192.

Figure 20:
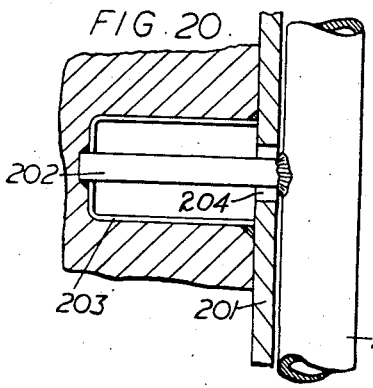

In the arrangement indicated in FIGURE 20 of the drawings, intermediate tube lengths 200 are tied to casing plates 201 at intervals along each tube length 200 by rods 202 welded to the tube length 200 and penetrating the casing plate 201 through a vertically elongated slot 204 therein, the outer end of each rod 202 being welded to a box-like member 203 welded to the outer side of the casing plate 201. The box-like member also serves to prevent furnace gas leakage through the vertically elongated slot 204. The dimensions of the rod 202 are such as to allow small relative movements between the intermediate tube length 200 and the casing plate 201 by flexion of the rod.

Figure 21:
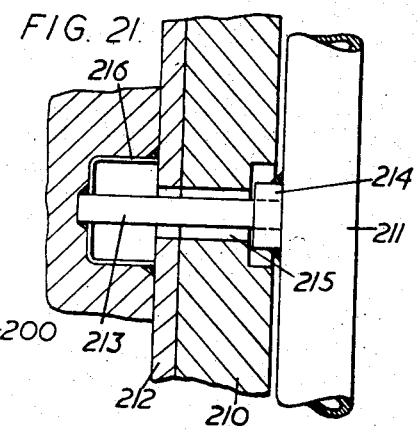

In the arrangement shown in FIGURE 21 of the drawings, in which insulating material 210 is provided between intermediate tube lengths 211 and casing plates 212, a rod 213 screws into a collar 214 welded to the intermediate tube lengths 211 at the outer side thereof. A vertically elongated slot 215 in the casing plates 212 and insulating material 210 accommodates the rod 213 and collar 214. The outer end of the rod 213 is welded to a box-like member 216 welded to the casing plate 212 and serving to prevent furnace gas leakage through the vertically elongated slot 215. The dimensions of the rod 213 are such as to allow small relative movements between the casing plates 212 and the intermediate tube lengths 211 by flexion of the rod.

Figure 22:
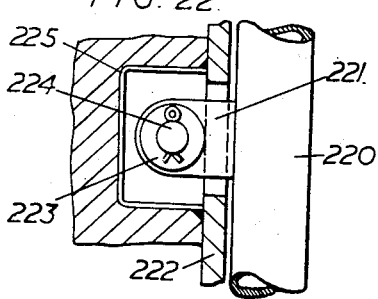
Figure 23:
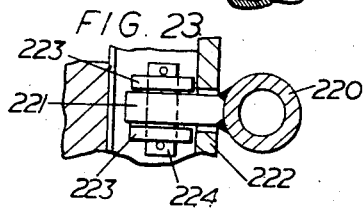

In the arrangement shown in FIGURES 22 and 23 of the drawings, intermediate tube lengths 220 are provided with lugs 221 welded to the intermediate tube length 220 and extending through respective vertical slits in a casing plate 222 and provided outside the casing plate with rollers 223 adapted to engage the outer side of the casing plates 122 and mounted on pins 224 extending through the lugs 221. Each lug 221 is protected by, and the slit in the casing plates 223 closed by, a box-like closure member 225 welded to the casing plate. Vertical movements of the tube 220 relative to the casing plate 222 are accommodated by movement of the rollers 223 over the outer side of the casing plates.

Figure 24:
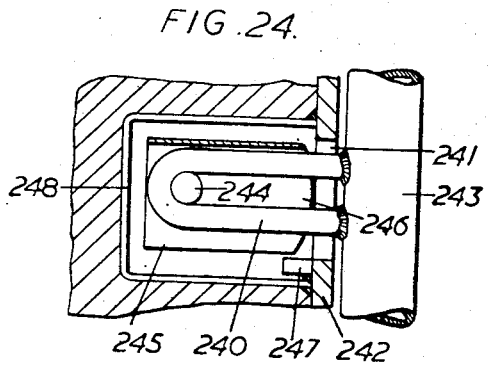
Figure 25:
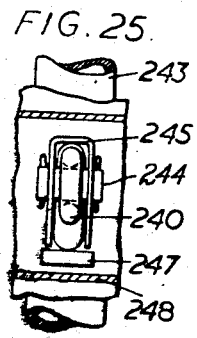

In the alternative arrangement shown in FIGURES 24 and 25 of the drawings, an elongated U-shaped member 240 extends through an aperture 241 in a casing plate 242 and is welded at its ends to an intermediate tube length 243, the member 240 encircling at its outer end a pin 244 engaged in the sides of a trough like member 245, the inner ends of the sides of the member 245 being curved to a radius having center at the pin 244 and being adapted to rock in a vertical direction on the outer side of the casing plates 242 on relative movement between the tube 243 and casing plates, a small ledge 247 being provided on the casing plates 242 to support the trough like member 245 at its inner end 246. The U-shaped member 240 is protected, and the aperture 241 is closed, by a box-like closure member 248 welded to the casing plate 242.

Figure 26:
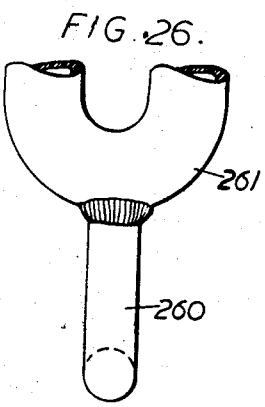
FIGURE 26 is an elevation of a drainage element suitable for use in conjunction with the tube arrangements shown.

When sinuous vapor generating tubes are utilized, the return bends at the lower ends thereof are formed with drain connection. A suitable drain connection is shown in FIGURE 26 of the drawings, and includes a tube 260 welded to a return bend 261 to which are welded the ends of tube limbs of the sinuous tube. The drain connections 260 of the sinuous tubes of a wall or section of a wall may be connected to a common drain header (not shown).

It will be appreciated that the invention includes for use in a vapor generator of the nature described above a wall section having a casing panel and parallel casing united-tube lengths disposed close to or in contiguous relationship with a face of the panel. The tube lengths are coterminus or approximately coterminus with the panel in the direction of its length and are rigidly united continuously or substantially continuously by welding with the panel from end to end or substantially from end to end thereof, with some or all of the casing-united tube lengths being spaced apart by short distances sufficient to accommodate an intermediate tube length or intermediate tube lengths.

In such a wall section the casing-united tube lengths may be united with the panel in any of the manners described above and the casing united tube lengths and the intermediate tube lengths may also be of any of the forms previously described.

The invention also includes the method of manufacturing a tubulous vapor generator wherein there are formed a number of wall sections which are assembled at site with the tube lengths in their operative positions and with edges of adjacent casing panels in abutting relationship, and the panels are welded together.

By such method a large part of the welding and constructional work may be carried out under shop conditions and the welds readily heat-treated, while the work of erection is simplified and expedited.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What it claimed is:

1. In a fluid heat exchange apparatus, metallic casing comprising a plurality of coplanar metallic panels, metallic means rigidly uniting said panels in the plane thereof and preventing movement of next adjacent panels relative to each other, a row of laterally spaced fluid conducting metal tube lengths extending along and contiguous to said panels, metallic means rigidly uniting pairs of next adjacent tube lengths to each other and to said panels and preventing movement of said panel-united tube lengths relative to said panels and cooperating with said panels to provide an uninterrupted metallic path of thermal conductivity between said panel-united tube lengths and along said panels, said panel-united tube lengths being constructed and arranged for parallel flow of fluid therethrough in the same direction and to receive fluid of approximately the same temperature at their inlets, another of said tube lengths being disposed intermediate said panel-united tube lengths, and means permitting longitudinal movement of said other tube length relative to said panels and to said panel-united tube lengths while inhibiting transverse movement of said other tube length away from said panels and relative to said panel-united tube lengths.

2. The combination of claim 1, wherein bar-like members extend normal to the panels and between each pair of adjacent panel-united tube lengths and are weld united to the panels and to the respective pairs of adjacent panel-united tube lengths.

3. In a fluid heating unit having a fluid circulation system, a wall subject to high temperature gases comprising metallic casing, a row of laterally spaced fluid conducting metal tube lengths extending along and contiguous to said casing, metallic means rigidly uniting some of said tube lengths to said casing and preventing movement of said casing-united tube lengths relative to said casing and co-operating with said casing to provide an uninterrupted metallic path of thermal conductivity between said casing-united tube lengths and along said casing, others of said tube lengths, being disposed intermediate said casing-united tube lengths, means connecting said tube lengths into said circulation system, said last named means including means for supplying a vaporizable fluid of substantially the same temperature in parallel flow relation to said casing-united tube lengths and effecting a flow of fluid therethrough in the same direction, each of said other tube lengths being bent into several parallel runs lying adjacent each other in the same plane and being serially connected to one of said casing-united tube lengths, and means permitting longitudinal movement of said other tube lengths relative to said casing and to said casing-united tube lengths while inhibiting transverse movement of said other tube lengths away from said casing and relative to said casing-united tube lengths.

4. The apparatus of claim 3, wherein said last-named means includes means forming a slot in one of said panels, and tube guide means including an element extending into said slot and connected at one end to one of said other tube lengths, and another element connected to the opposite end of said first named element and slidably secured to the outer surface of said one panel.

5. The apparatus of claim 3, wherein said last-named means includes a pair of hook-like members fixedly secured to one of said panels, and another hook-like member fixedly secured to one of said other tube lengths and adapted to interlock with said pair of hook-like members.

6. The apparatus of claim 3, wherein said last-named means includes means forming a slot in one of said panels, and tube guide means including an enclosing member about said slot and secured to the outer surface of said one panel, and a flexible rod extending freely through said slot and fixedly secured at one end to one of said other tube lengths and at its opposite end to said enclosing member.

7. The apparatus of claim 3, wherein said last-named means includes means forming a slot in one of said panels, and tube guide means including a U-shaped member extending through said slot and fixedly secured at its opposite ends to one of said other tube lengths, an inverted trough-like member about said U-shaped member, and a pin extending through and engaging the bend of said U-shaped member and connected to opposite sides of said trough-like member being arc-shaped and adapted to rock on the outer surface of said one panel on movement between said one other tube length and said one panel.

8. The apparatus of claim 3, wherein said last-named means includes a fin extending in the direction of one of said other tube lengths and rigidly secured to one of said panel-united tube lengths, and a transverse bar between said fin and said panels fixedly secured to said one other tube length and having one end disposed in overlapping relation with said fin.

9. The combination of claim 3, wherein each of the casing-united tube lengths has one end bifurcated and the bifurcations of each casing-united tube length are connected to a pair of parallel run tube lengths.

References Cited in the file of this patent

UNITED STATES PATENTS

| | | |
|---|---|---|
| 1,774,150 | Murray | Aug. 26, 1930 |
| 1,930,688 | Murray | Oct. 17, 1933 |
| 1,972,100 | Lucke | Sept. 4, 1934 |
| 2,099,829 | Smith | Nov. 23, 1937 |
| 2,119,817 | Keller | June 7, 1938 |
| 2,536,039 | Craven | Jan. 2, 1951 |

FOREIGN PATENTS

| | | |
|---|---|---|
| 562,910 | Belgium | Dec. 31, 1957 |
| 561,756 | Great Britain | June 2, 1944 |
| 671,658 | Great Britain | May 7, 1952 |